US010570985B2

(12) United States Patent
Chen et al.

(10) Patent No.: US 10,570,985 B2
(45) Date of Patent: Feb. 25, 2020

(54) HIGH FREQUENCY VIBRATION SPINDLE SYSTEM (71) Applicant: NATIONAL CHUNG HSING UNIVERSITY, Taichung (TW)

(72) Inventors: Jenq-Shyong Chen, Taichung (TW); Hao-Tang Wang, Taichung (TW)

(73) Assignee: NATIONAL CHUNG HSING UNIVERSITY, Taichung (TW)

(*) Notice: Subject to any disclaimer, the term of this patent is extended or adjusted under 35 U.S.C. 154(b) by 0 days.

(21) Appl. No.: 15/898,638

(22) Filed: Feb. 18, 2018

(65) Prior Publication Data
US 2019/0085933 A1 Mar. 21, 2019

(30) Foreign Application Priority Data

Sep. 15, 2017 (TW) .............................. 106131693 A (51) Int. Cl.
B23B 37/00 (2006.01)
F16F 15/12 (2006.01)
G01M 7/02 (2006.01)
F16D 3/68 (2006.01)
F16D 3/12 (2006.01)
B23Q 1/34 (2006.01)
B24B 1/04 (2006.01)
(Continued)

(52) U.S. Cl.
CPC ............ F16F 15/12 (2013.01); B23Q 1/0009 (2013.01); B23Q 1/34 (2013.01); B24B 1/04 (2013.01); F16D 3/12 (2013.01); F16D 3/68 (2013.01); G01M 7/02 (2013.01); B23B 29/125 (2013.01); B23B 37/00 (2013.01); B23B 2260/108 (2013.01); B23Q 2230/004 (2013.01)

(58) Field of Classification Search
CPC ... F16F 15/12; B24B 1/04; B23Q 1/34; B23Q 1/0009; B23Q 2230/004; F16D 3/12; F16D 3/36; G01M 7/02; B23B 37/00; B23B 2260/108; B23B 29/125
See application file for complete search history.

(56) References Cited

FOREIGN PATENT DOCUMENTS

CN 102151867 A 8/2011
CN 204294942 U 4/2015
(Continued)

OTHER PUBLICATIONS

Taiwanese Intellectual Property Office, Office Action with Search Report, dated Dec. 4, 2018, 12 pages.

Primary Examiner — Sunil K Singh
Assistant Examiner — Paul M Janeski
(74) Attorney, Agent, or Firm — Muncy, Geissler, Olds & Lowe, P.C.

(57) ABSTRACT

A high frequency vibration spindle system which includes a spindle having a spindle housing and a spindle shaft disposed in the spindle housing; a toolholder, engaged with the spindle and adapted to be engaged with a tool; an electric power transmission device disposed at the front end or a rear end of the spindle, including a first coil and a second coil; the first coil is disposed on the spindle housing, and the second coil is disposed on the spindle shaft to be rotated with the spindle shaft coaxially; the first coil and the second coil are spaced with a gap; the second coil is adapted to receive an electric power from the first coil with a non-contact induction method; and a transducer, adapted to be controlled to vibrate the tool and disposed in the toolholder and electrically connected with the second coil to receive the electric power.

16 Claims, 9 Drawing Sheets (51) Int. Cl.
*B23Q 1/00* (2006.01)
*B23B 29/12* (2006.01)

(56) References Cited

FOREIGN PATENT DOCUMENTS

| | | |
|---|---|---|
| CN | 205852411 U | 1/2017 |
| JP | H05208349 A | 8/1993 |
| TW | M372763 U | 1/2010 |
| TW | M432499 U | 7/2012 |
| TW | 201410363 A | 3/2014 |
| TW | 201617186 A | 5/2016 |

FIG.8

HIGH FREQUENCY VIBRATION SPINDLE SYSTEM

BACKGROUND OF THE INVENTION

1. Technical Field

The present invention relates to a machining device, and more particularly to a high frequency vibration spindle system with vibration assisted machining function.

2. Description of Related Art

Among the field of machining equipment, with the fast development in technology, there is an increasing demand for processing high hardness or brittle materials which are difficult to machine or grind, and therefore the requirement for the processing quality and efficiency of the machining tool are also getting higher. Therefore, it becomes more common to utilize a vibration assisted spindle system which could generates a high frequency vibration on the tool to process a workpiece, such as grinding, cutting or hole-drilling. Wherein, the aforementioned processing method not only enables the micro-particles being separated from the surface of the workpiece under the high frequency vibration, which could reduce the processing debris or mold debris, and thereby to mitigate the cutting resistance and extend the service life of the tool, but also makes the surface of the workpiece smoother so as to improve the fineness and quality of the workpiece.

However, the current spindle systems of the high frequency vibration system usually utilize a contact-type power transmission method, such as a conductive slip ring or a conductive brush. The contact-type power transmission method has several drawbacks. For instance, the conductive slip ring and the conductive brush easily be deteriorated or damaged due to a long time contact with each other. Besides, it is also possible to generate electric sparks by the high-speed frictional contact between the conductive slip ring and the conductive brush, which results in an uncertainty in proceeding the vibration assisted processing process. Moreover, in order to mitigate the deterioration problems of the conductive ring and the conductive brush, it usually requires to limit the rotation speed of the spindle, such that the demand for a higher spindle speed of vibration assisted processing cannot be fulfilled.

Therefore, it is still a need to provide a high frequency vibration spindle system which is less likely to deteriorate and has a high efficiency and a long service life.

BRIEF SUMMARY OF THE INVENTION

In view of the reasons mentioned above, the primary objective of the present invention is to provide a high frequency vibration spindle system capable of transmitting electric power with a non-contact type method, which minimizes the deterioration, increases the service life of the tool, and provides a higher maximum rotation speed of the spindle.

The present invention provides a high frequency vibration spindle system, which includes a spindle, including a spindle housing and a spindle shaft, wherein the spindle has a front end and a rear end opposite to the front end, and the spindle shaft is disposed in the spindle housing in a rotatable manner; a toolholder, having an internal space and engaged with a front end of the spindle with a detachable manner, being adapted to be engaged with a tool; an electric power transmission device, including a first coil and a second coil, wherein the electric power transmission device is disposed at the front end or a rear end of the spindle; the first coil is disposed on the spindle housing, and the second coil is disposed on the spindle shaft to be rotated with the spindle shaft coaxially; the first coil and the second coil are spaced apart from each other with a gap; the second coil is adapted to receive an electric power from the first coil with a non-contact induction method; and a transducer, adapted to be controlled to vibrate the tool and being disposed in the internal space of the toolholder and electrically connected with the second coil to receive the electric power.

The advantage of the present invention is that it effectively improves the conventional spindle systems which have deterioration problems due to operating with the contact-type transmission method and the difficulty in increasing the spindle rotation speed by utilizing the non-contact induction method mentioned above.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
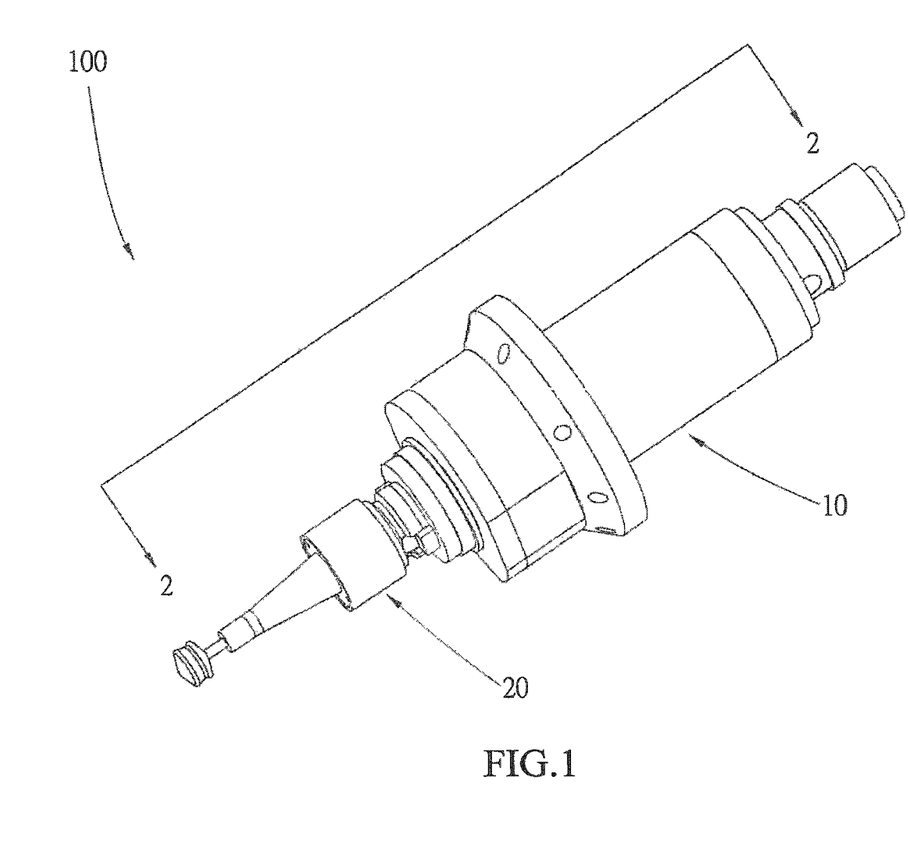
FIG. 1 is a schematic view of a high frequency vibration spindle system of a first embodiment according to the present invention.
Figure 2:
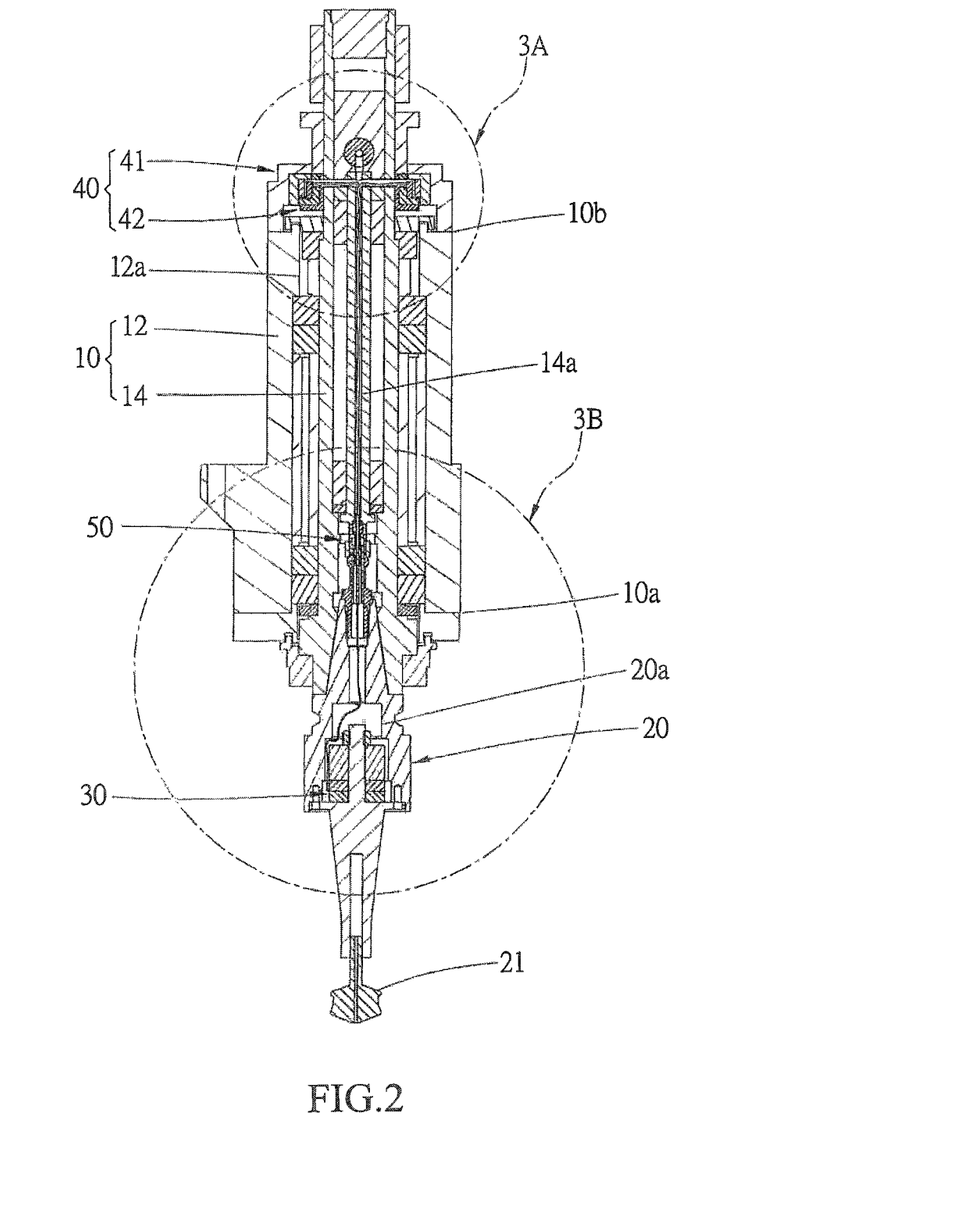
FIG. 2 is a sectional view along the 2-2 line of FIG. 1, showing the relations between the components of the high frequency vibration spindle system.
Figure 3A:
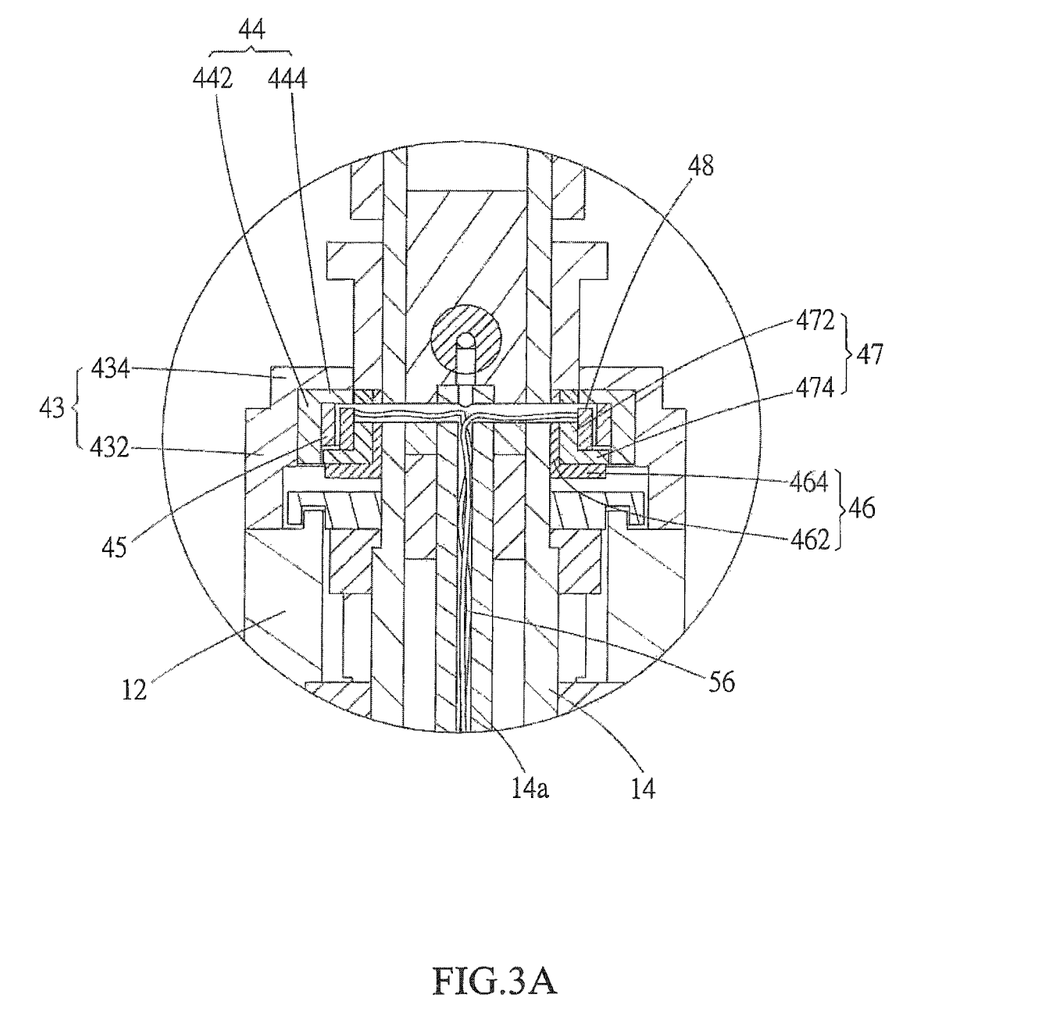
FIG. 3A is a sectional enlarged view of the high frequency vibration spindle system of FIG. 2.
Figure 3B:
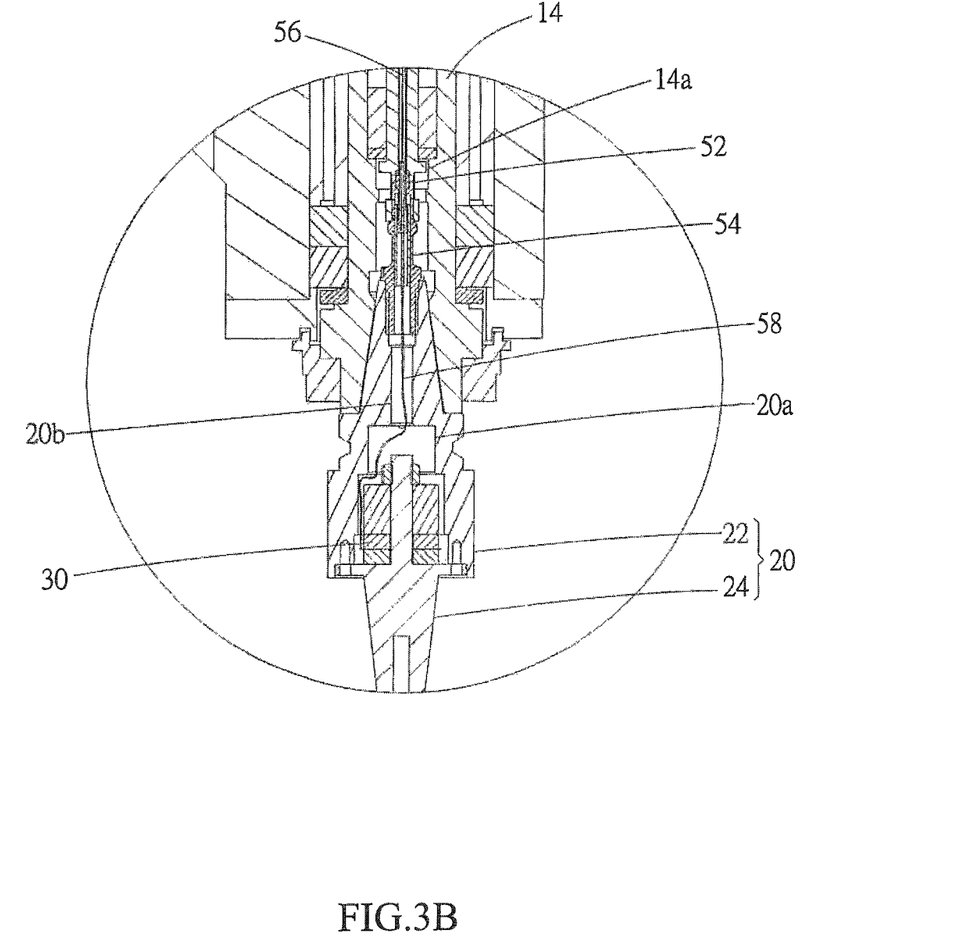
FIG. 3B is a sectional enlarged view of the high frequency vibration spindle system of FIG. 2.

The following illustrative embodiments and drawings are provided to illustrate the disclosure of the present invention, these and other advantages and effects can be clearly understood by persons skilled in the art after reading the disclosure of this specification. As illustrated in FIG. 1 and FIG. 3B, a high-frequency vibration spindle system 100 of a first embodiment according to the present invention includes a spindle 10, a toolholder 20, a transducer 30, an electric power transmission device 40, and an electric coupling module 50.

The spindle 10 includes a front end 10a and a rear end 10b opposite to the front end 10a. The spindle 10 includes a housing 12 and a spindle shaft 14 disposed within the housing 12. The housing 12 has an axial hole 12a extended along a longitudinal axis thereof, and the spindle shaft 14 is disposed in the axial hole 12a, wherein the spindle shaft 14 is rotatable corresponding to the housing 12 axially and has a channel 14a formed therein along the longitudinal axis.

The toolholder 20 is coupled the front end 10a of the spindle 10, and is adapted to be connected with a tool 21 to perform a processing on a workpiece. The toolholder 20 has a base 22 and a horn 24. The base 22 is disposed on the spindle shaft 14 and is rotated with the spindle shaft 14 coaxially. The base 22 has an accommodating space 20a to be fitted with the horn 24. A through hole 20b is provided within the horn 24 and is extended along the longitudinal axis, wherein the accommodating space 20a and the through hole 20b communicate with each other. The horn 24 has a front end and a rear end opposite to the front end, and the front end of the horn 24 is adapted to be coupled with the tool 21, while the rear end of the horn 24 fits within the accommodating space 20a.

The transducer 30 is disposed in the accommodating space 20a of the toolholder 20. The transducer 30 is adapted to be controlled to drive the tool 21 connected with the toolholder 20 to vibrate. Wherein, the transducer 30 can be made of a capacitive element or a piezoelectric element, such as a piezoelectric ceramic material, which could be driven by an electric power to generate high frequency vibration, and thereby to directly or indirectly drive the tool 21 provided on the toolholder 20 to vibrate. Wherein, it is preferred that the aforementioned high frequency vibration has a vibration frequency greater than 10 KHz. In the current embodiment, the transducer 30 is disposed on the horn 24, and the vibration generated therefrom could be transferred to the tool 21 through the horn 24 so as to drive the tool 21 to vibrate.

The electric power transmission device 40 is disposed at the rear end 10b of the spindle 10, and includes a first coil 41 and a second coil 42. The first coil 41 is positioned on the housing 12 and electrically connected to a power supply (not shown) to receive an electric power provided therefrom. The first coil 41 is further adapted to transmit the electric power to the second coil 42. The second coil 42 is positioned on the spindle shaft 14 to be rotated with the spindle shaft 14 coaxially. Wherein, the second coil 42 does not contact the first coil 41 and is spaced apart from the first coil 41 with a gap, whereby the second coil 42 could receive the electric power by a non-contact induction with the first coil 41. In addition, a CNC controller can be connected to the power to provide a control signal to the power and the transducer, which is based on the requirement of the workpiece or the processing, thereby to produce a vibration wave and a frequency corresponding to the requirement.

In the current embodiment, the first coil 41 is an annular body, which surrounds the spindle shaft 14 and the second coil 42. The first coil 41 includes a first sleeve 43, a first ferrite core 44 and a first coil assembly 45. Wherein, the first sleeve 43 is disposed on the housing 12 and surrounds the spindle shaft 14; the first ferrite core 44 fits around an inner circumference of the first sleeve 43, while an inner circumference of the first ferrite core 44 is fit around by the first coil assembly 45; the first ferrite core 44 and the first coil assembly 45 surround the spindle shaft 14 as well. Similarly, the second coil 42 is an annular body, which surrounds the spindle shaft 14 and is positioned between the first coil 41 and the spindle shaft 14. The second coil 42 includes a second sleeve 46, a second ferrite core 47 and a second coil assembly 48. Wherein, the second sleeve 46 is disposed on and surrounds the spindle shaft 14; the second ferrite core 47 is positioned around an exterior circumference of the second sleeve 46 and surrounds the spindle shaft 14, while the second coil assembly 48 is positioned around an exterior surface of the second ferrite core 47 to be opposite to the first coil assembly 45 in the radial direction and surrounds the spindle shaft 14.

The first ferrite core 44 is formed with an annular shape having a first wall portion 442 and a first shoulder portion 444 extending inwardly from the first core wall portion 442 in the radial direction. The first ferrite core 44 abuts against the first coil assembly 45 via the first core wall portion 442 and the first core shoulder portion 444, whereby the first coil assembly 45 could be firmly supported by being abutted against the first ferrite core 44 in two directions. The second ferrite core 47 is formed with an annular shape having a second wall portion 472 and a second shoulder portion 474 extending outwardly from the second core wall portion 442 in the radial direction. The second ferrite core 47 abuts against the second coil assembly 48 via the second core wall portion 472 and the second core shoulder portion 474, whereby the second coil assembly 48 could be firmly supported by being abutted against the second ferrite core 47 in two directions.

Preferably, the first ferrite core 44 and the second ferrite core 47 are respectively integrally formed by powder metallurgy with a ceramic material, which makes the structures more stable. Each of the first ferrite core 44 and the second ferrite core 47 has an L-shape cross-section in the axial direction, wherein the cross-sections of the first ferrite core 44 and the second ferrite core 47 are complementary with each other (e.g. the cross-section of the first ferrite core 44 is an inverse L-shape, and the cross-section of the second ferrite core 47 is an L-shape), and an overall structure thereof is simple and compact, which effectively shortens the production time and cost of the ferrite core, and provides an advantage in low-cost mass production. Furthermore, since the L-shape ferrite core has a small volume, the ferrite core could be manufactured with a small die-casting machine, enabling the manufacturing cost of the ferrite core to be reduced, whereby the ferrite core is less likely to break and lowering a probability of forming the internal porosity during the die-casting process.

In addition, the first core shoulder portion 444 and the second core shoulder portion 474 are arranged in a manner that, as viewed from outside of the spindle 10 toward the axis thereof, the projections of the first core shoulder portion 444 and the second core shoulder portion 474 are overlapped with each other, which encloses the first coil assembly 45 and the second coil assembly 48 in a space between the first core shoulder portion 444 and the second core shoulder portion 474, and thereby avoiding an invasion of foreign body into the first coil assembly 45 and the second coil assembly 48 and improving the alignment convenience for assembling the components.

With the aforementioned design of the L-shape first ferrite core 44 and second ferrite core 47, the first coil assembly 45 and the second coil assembly 48 could be manufactured with a standardized process. For instance, the second coil assembly 48 could be formed by winding an enameled wire coated with an insulating layer first, then adhering by applying an adhesive. Then, the second coil assembly 48 could be fit around the second ferrite core 47 to be abutted against the second core wall portion 472 and the second core shoulder portion 474, and thereby to be firmly supported by the second ferrite core 47, which achieves a fast and standardized manufacturing process for the second coil assembly.

Furthermore, with the design that the first coil 41 and the second coil 42 are concentrically disposed and overlapped with each other in the radial direction, the space utilization rate could be effectively increased so as to reduce a total length of the spindle system.

The first sleeve 43 is formed with an annular body having a first sleeve wall portion 432 and a first sleeve shoulder portion 434 extending inwardly from the first sleeve wall portion 432 in the radial direction, wherein the first sleeve wall portion 432 is engaged with the spindle housing 12; the first sleeve wall portion 432 and the first sleeve shoulder portion 434 respectively abut against the first core wall portion 442 and the first core shoulder portion 444. The second sleeve 46 is formed with an annular body having a second sleeve wall portion 462 and a second sleeve shoulder portion 464 extending outwardly from the second sleeve wall portion 462 in the radial direction, wherein the second sleeve wall portion 462 is engaged with an exterior circumference of the spindle shaft 14; the second sleeve wall portion 462 and the second sleeve 464 respectively abut against the second core wall portion 472 and the second core shoulder portion 474. In this way, with the design of the first sleeve 43 and the second sleeve 46, the first ferrite core 44 and the second ferrite core 47 could be firmly supported by being abutted against the first sleeve 43 and the second sleeve 46 in two directions.

The electric coupling module 50 includes a first coupling part 52 and a second coupling part 54, wherein the first coupling part 52 is disposed on the spindle shaft 14 and electrically connected to the second coil 42 to receive the electric power; the second coupling part 54 is disposed on the toolholder 20 and electrically connected to the transducer 30; the second coupling part 54 is engaged with the first coupling part 52 in a detachable manner so as to receive the electric power and transmit the electric power to the transducer 30. It is worth mentioning that a flexible structure, such as a rubber structure, could be provided on either one connecting surface of the first coupling part 52 and the second coupling 54 to absorb the shock created therebetween during the operation of the high frequency vibration spindle system, thereby increasing the service life thereof. Besides, at an engaging part between the first coupling part 52 and the second coupling part 54, a suitable buffer space may be remained to provide a buffer margin during the operation of the high frequency vibration spindle system.

In one embodiment, the first coupling part 52 can be a conductive socket, while the second coupling part 54 can be a conductive plug, but it is not limited thereto. In another embodiment, the first coupling part 52 can be a conductive plug, while the second coupling part 54 can be a conductive socket. In still another embodiment, the first coupling part 52 and the second coupling part 54 can be contact terminals which are electrically connected or electrically separated corresponding to each other.

Wherein, the aforementioned method that the second coupling part 54 can be engaged with the first coupling part 52 with the detachable manner means that when the toolholder 20 is engaged with the spindle 10, the second coupling part 54 contacts the first coupling part 52 to conduct and receive the electric power from the first coupling part 52; on the other hand, when the toolholder 20 is detached from the spindle 10, the second coupling part 54 is separated from and without contact with the first coupling part 52 so as to keep an electrically isolated relation between the second coupling part 54 and the first coupling part 52.

In the current embodiment, the first coupling part 52 is disposed in the channel 14*a* of the spindle shaft 14. The electric coupling module 50 further includes a first conductive wire 56, which penetrates through the channel 14*a*, having one end electrically connected with the second coil 42 and another end electrically connected with the first coupling part 52 to transmit the electric power from the second coil 42 to the first coupling part 52. Meanwhile, the second coupling part 54 is disposed above the through hole 20*b* of the toolholder 20. The electric coupling module 50 further includes at least one second conductive wire 58, which extends within the through hole 20*a* of the toolholder 20, having one end electrically connected with the second coupling part 54 and another end electrically connected with the transducer 30 to transmit the electric power received by the second coupling part 54 to the transducer 30.

With the aforementioned non-contact induction method, the electric power from the fixed first coil 41 could be effectively transmitted to the second coil 42 which is coaxially rotated with the spindle shaft 14 first, and then be further provided to the transducer 30 with the electric coupling module 50, whereby the drawbacks of the conventional methods utilizing contact-type electric transmission could be effectively solved, which minimizes the deterioration, increases the service life, and provides a higher maximum rotation speed of the spindle.

Figure 4:
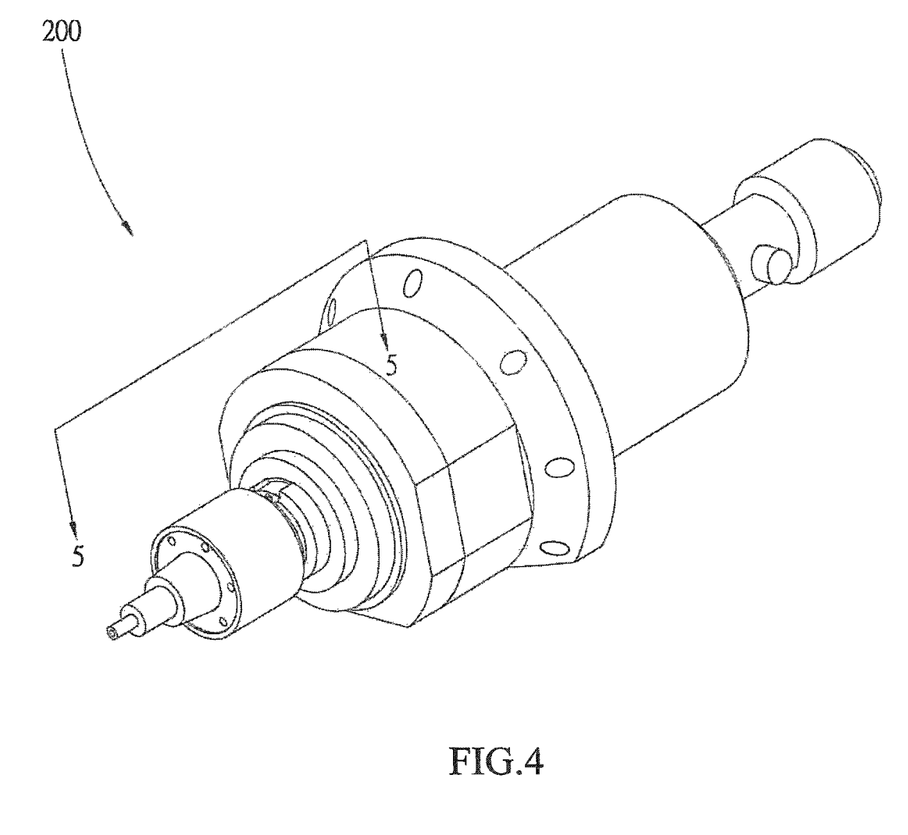
FIG. 4 is a schematic view of a high frequency vibration spindle system of a second embodiment according to the present invention.
Figure 5:
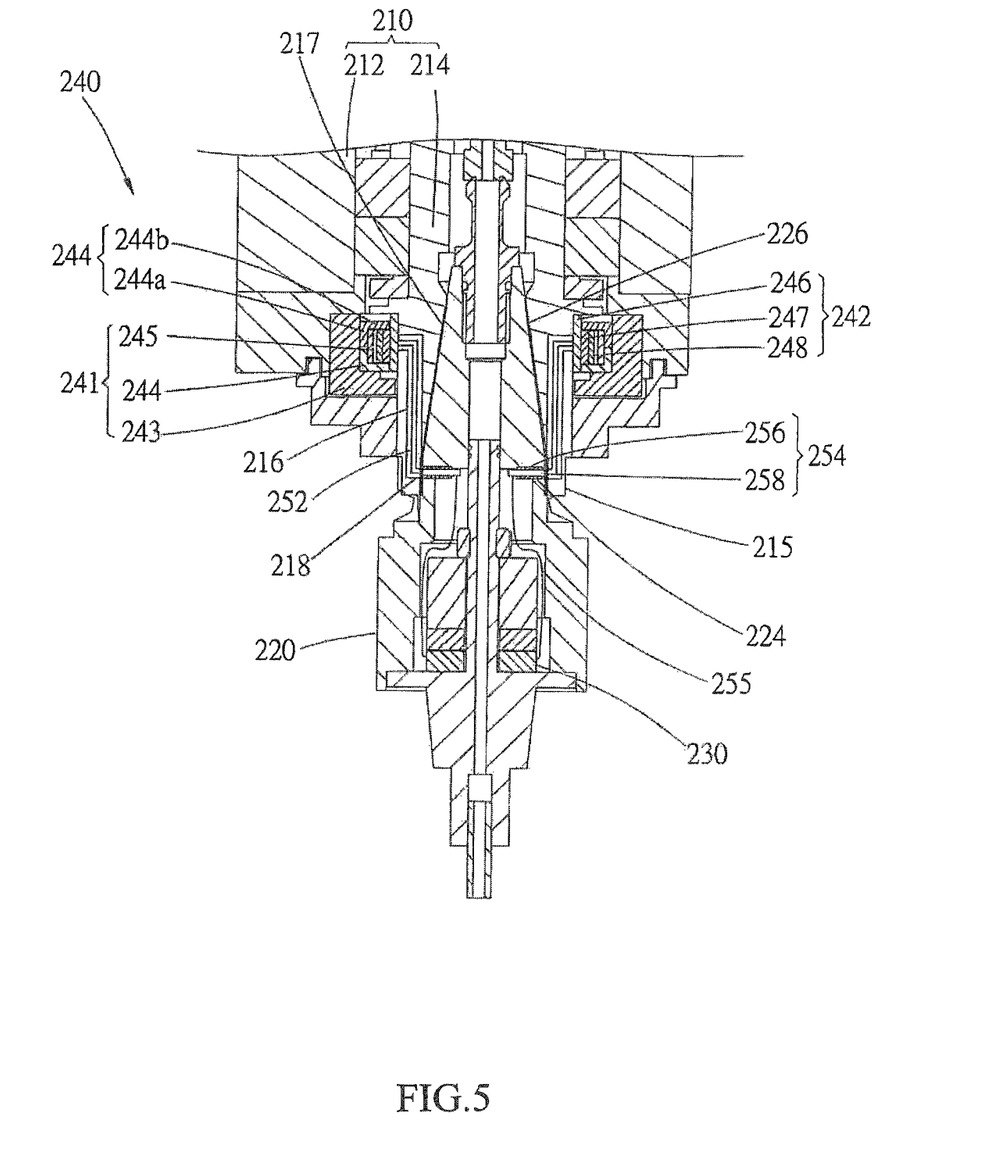
FIG. 5 is a sectional view along the 5-5 line of FIG. 4, showing the relations between the components of the high frequency vibration spindle system.
Figure 6:
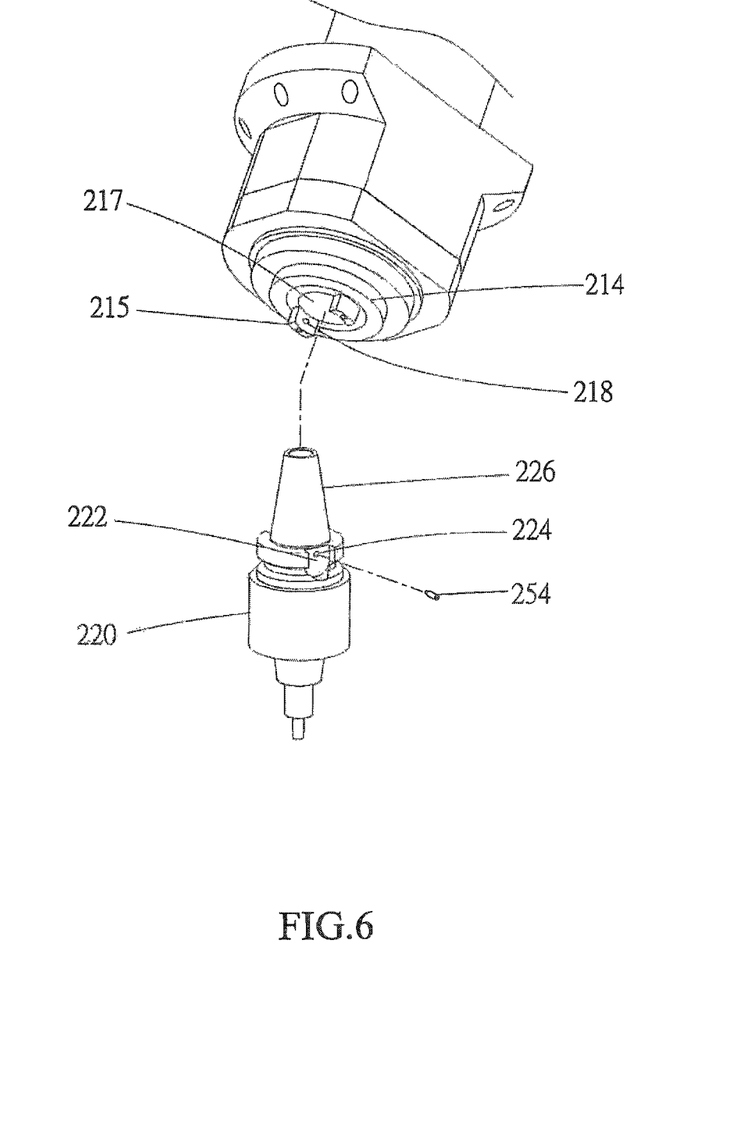
FIG. 6 is a sectional exploded view of the toolholder and the spindle of the second embodiment of the present invention.

As shown in FIG. 4 to FIG. 6, a high frequency vibration spindle system 200 of a second embodiment according to the present invention is illustrated. The high frequency vibration spindle system 200 includes a similar structure with the high frequency vibration spindle system 100 of the first embodiment. Wherein, the high frequency vibration spindle system 200 is different from the high frequency vibration spindle system 100 in that the structure and the position of the electric power transmission device 240 are different from those of the electric power transmission device 40 of the first embodiment. In this embodiment the electric power transmission device 240 is disposed at a front end of the spindle 10, wherein the electric power transmission device 240 includes a first coil 241 and a second coil 242. The first coil 241 surrounds the spindle shaft 214 and the second coil 242, wherein the first coil 241 includes a first sleeve 243, a first ferrite core 244 and a first coil assembly 245. The first sleeve 243 is formed with an annular shape and disposed on the front end of the housing 212 of the spindle 210. The first ferrite core 244 fits around an inner circumference of the first sleeve 243, and includes two first core bodies 244 which are annular shaped, wherein each of the two first core bodies has a first core wall portion 244*a* and a first core shoulder portion 244*b* extending inwardly from the first core wall portion 244*a*, and the two first core bodies are symmetrically arranged along an axial direction of the spindle shaft 214. The two first core wall portions 244*a* of the two first core bodies 244 face with each other and abut against the first sleeve 243. Preferably, the first core wall portions 244*a* of the two first core bodies 244 abut against each other, which forms a stable magnetism loop. The first coil 245 is formed with an annular shape which fits around an inner circumference of the first ferric core 244 to be abutted against the two first core wall portions 244*a* of the two first core bodies 244 and positioned between the two first core shoulder portions 244*b*.

The second coil 242 surrounds the spindle shaft 214 and includes a second sleeve 246, a second ferrite core 247 and a second coil assembly 248. The second sleeve 246 is an annular shape and disposed on the spindle shaft 214; the second ferrite core 247 fits around an exterior circumference of the second sleeve 246; the second coil assembly 248 is an annular shape and fits around an exterior surface of the second ferrite core 247 to be opposite to the first coil assembly 245 in the radial direction of the spindle shaft 14.

In addition, the two first core shoulder portions 244b of the two core bodies 244 are arranged in a manner that, as viewed from outside of the spindle 210 toward the axis thereof, the projections of the two first core shoulder portions 244b are overlapped with each other, and the second ferrite core 247 and the second coil assembly 248 are located in an area enclosed by the projection of the two first core shoulder portions 244b in the axial direction. Moreover, the second ferrite core 247 has two ends, being spaced apart from the two first core shoulder portions 244b of the two core bodies 244 with a gap (e.g. an air gap) in the axial direction.

In one embodiment, the two first core bodies 244 have the same structure, which is integrally formed by die-casting with material and has a better structural reliability. With the aforementioned two-piece design of the first ferrite cores, i.e., a symmetrical combination of two first core bodies 244 having identical structures, it is favorable to utilize a single mold to manufacture the first ferrite cores, thereby reducing the cost of the apparatus and manufacturing process of the first ferrite core. Additionally, with the design of utilizing a combination of two first ferrite core bodies 244 having simple and compact structures, the first ferrite core could be manufactured with a die-cast machine of a smaller size, thereby having an advantage of reducing the cost of manufacturing apparatus. Furthermore, with the aforementioned structure design, it is favorable to improve the yield rate of manufacturing the first ferrite core and the first core bodies. Since the first ferrite core is constituted by two first ferrite bodies having compact structures, the first ferrite core is less likely to have warping deformation as the integrally-formed ferrite core, which has a cross-section of C-shape, whereby the yield rate could be improved and therefore the manufacturing cost could be reduced.

The spindle 10 further includes at least one alignment pin 215 disposed at the front end of the spindle shaft 214, wherein the at least one alignment pin 215 is provided with the first coupling part 252 thereon. In the current embodiment, the spindle 10 includes two alignment pins 215, which are opposite to each other, and each of the alignment pin 252 is provided with one first coupling part 252 thereon respectively, wherein the first coupling parts 252 are electrically connected to the electric power transmission device 240 to receive an electric power. Inside of the spindle shaft 214 is provided with a coupling hole 216 and a positioning hole 218, wherein the coupling hole 216 communicates with the electric power transmission device 240, and the first coupling part 252 is disposed in the coupling hole 216; the positioning hole 218 communicates the coupling hole 216 to the surface of the alignment pin 215.

The high frequency vibration spindle system 200 further includes at least one alignment slot 222 formed on an exterior circumference of the toolholder 220. The at least one alignment slot 222 is configured to receive the at least one alignment pin 215, wherein the at least one alignment slot 222 and the at least one alignment pin 215 are complementary and could be engaged with each other in a detachable manner. The at least one slot 222 is provided with a second coupling part 254 on an inner surface thereof, which is adapted to be electrically connected to the first coupling part 252. In the current embodiment, the high frequency vibration spindle system 200 includes two alignment slots 222 opposite to each other. On the surface of each of the alignment slots 222 is formed with a slot hole 224 communicating with an internal space of the toolholder 220. The second coupling part 254 is disposed in the slot hole 224 and has one end penetrating through the slot hole 224 into the internal space to be electrically connected with the transducer 230 via a conductive wire 255. In this way, when the toolholder 220 is engaged with the spindle shaft 215, the alignment slot 222 of the toolholder 220 and the alignment pin 215 of the spindle shaft 214 are aligned and engaged with each other, whereby the second coupling part 254 and the first coupling part 252 are electrically connected. Preferably, the second coupling part 254 includes a sleeve part 256 and a positioning post 258, wherein the sleeve part 256 is fixed into the slot hole 256, and the positioning post 258 extends within the sleeve part 256 in a slidable manner. The positioning post 258 is made of conductive material and electrically connected with the conductive wire 256. When the toolholder 220 is engaged with the spindle shaft 214, the positioning post is driven by an elastic force of an elastic member (not shown) to extend into the positioning hole 218, whereby the positioning post 258 could be electrically connected with the first coupling part 252, which is disposed in the positioning hole 218, to transmit the electric power.

It is worth mentioning that it is not limited to utilize only a single or two alignment pins/alignment slots. In other embodiments, there could be three or more alignment pins/alignment slots. Preferably, the plural alignment pins are symmetrically arranged, and the plural alignment slots are also symmetrically arranged.

Additionally, the high frequency vibration spindle system 200 of the second embodiment could utilize an electric power transmission device having an identical structure with the electric power transmission device 40 of the first embodiment, in addition to the electric power transmission device 240 mentioned above. Similarly, the high frequency vibration spindle system 100 of the first embodiment could utilize an electric power transmission device having an identical structure with the electric power transmission device 240 of the second embodiment, in addition to the electric power transmission device 40 mentioned above.

As illustrated in FIG. 5 and FIG. 6, the spindle shaft 214 has a conical hole 217, which is disposed at the front end of the spindle shaft 214 and extended in the axial direction, while corresponding to the conical hole 217, the toolholder 220 has a conical section 226. Wherein, in one embodiment, the first coupling part could be disposed on an inner surface of the conical hole 217 rather than the alignment pin, and the second coupling part could be disposed on an exterior surface of the conical section 226 of the toolholder 220 rather than the alignment slot, thereby enabling an electrical contact between the first coupling part in the conical hole 217 and the second coupling part on the conical section 226 when the toolholder 220 is engaged with the spindle shaft 214.

Figure 7:
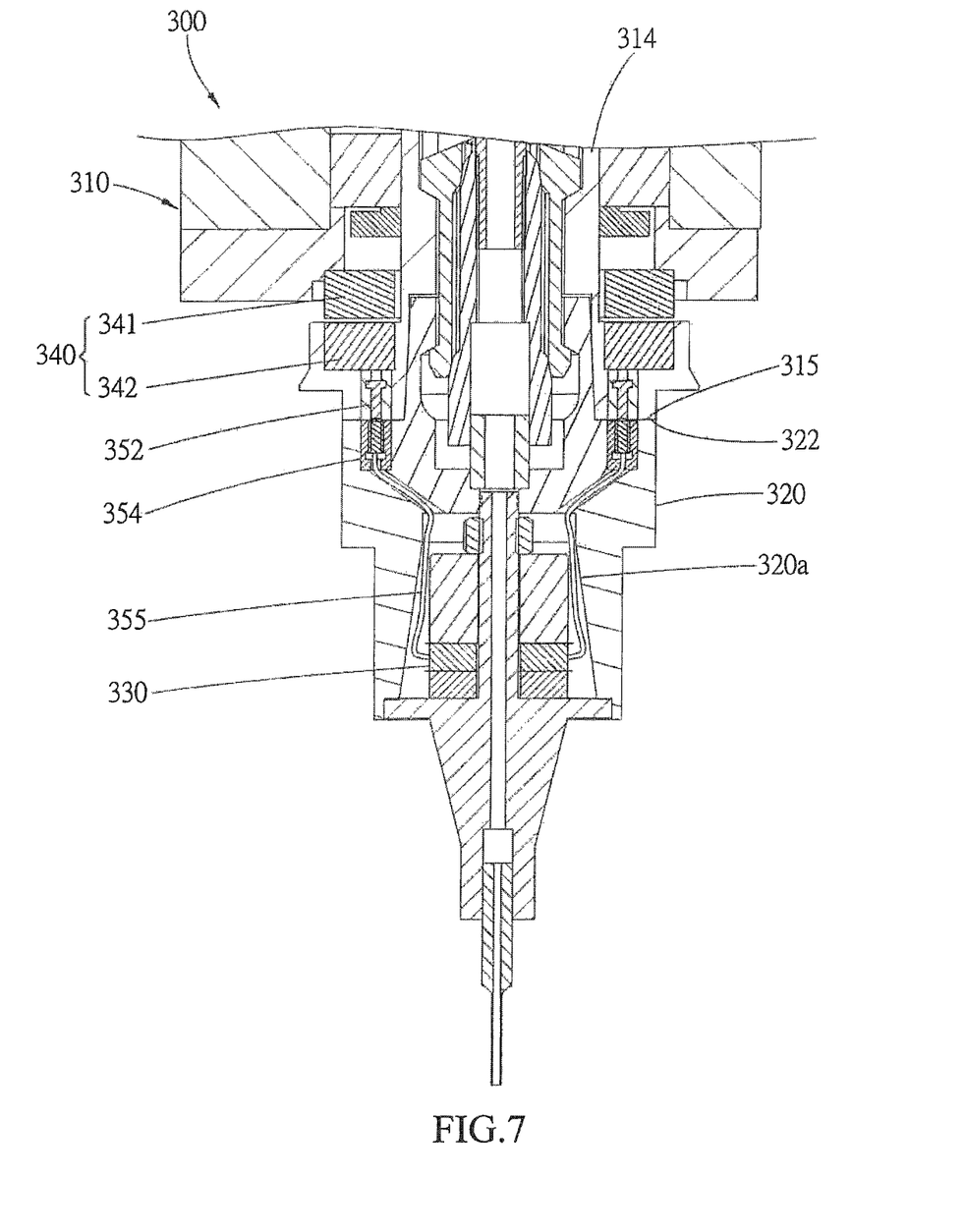
FIG. 7 is a partial cross-sectional view of a high frequency vibration spindle system of a third embodiment according to the present invention.
Figure 8:
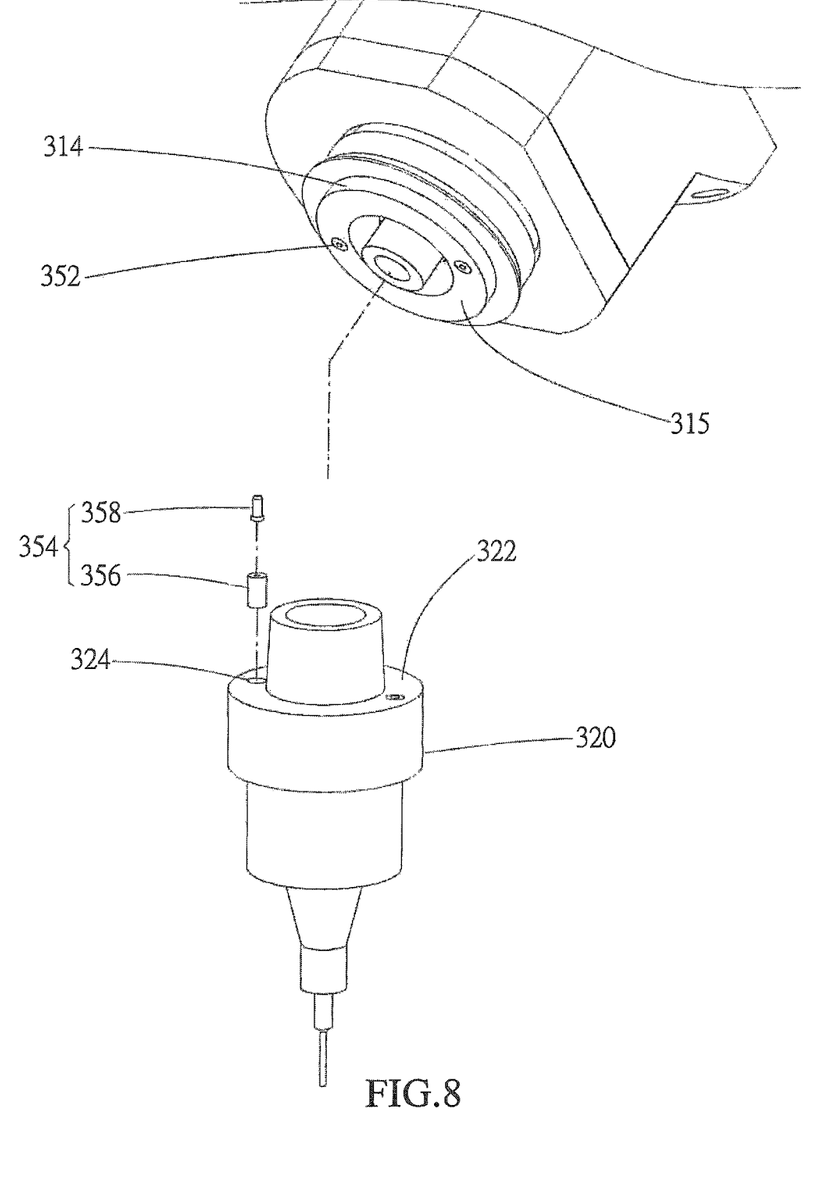
FIG. 8 is sectional exploded view of the toolholder and the spindle of the third embodiment of the present invention.

Further, referring to FIG. 7 and FIG. 8, a high frequency vibration spindle system 300 of a third embodiment according to the present invention is illustrated. The high frequency vibration spindle system 300 includes a similar structure with the high frequency vibration spindle systems of the aforementioned embodiments. Wherein, the high frequency vibration spindle system 300 is different from the above high frequency vibration spindle systems in that the electric power transmission device 340 is disposed at a front end of the spindle 310, having a first coil 341 and a second coil 342 overlapped with each other in the axial direction.

Particularly, in the spindle 310 of this embodiment, the spindle shaft 314 has a first flange surface 315 which faces forward, and the toolholder 320 has a second flange surface 322 which faces rearward, whereby the first flange surface 315 and the second flange surface 322 could face with each other or abut against each other. Wherein, a first coupling part 352 is disposed on the first flange surface 315, and the second coupling part 354 is disposed on the second flange surface 322.

The first flange surface 315 is provided with a through hole 316 communicating with the second coil 342, and the first coupling part 352 is disposed in the through hole 316. The first coupling part 352 is electrically connected to the second coil 342 to receive the electric power transmitted from the first coil 341. The second flange surface 322 is provided with a through hole 324 communicating with an internal space 320a of the toolholder 320, and the second coupling part 354 is disposed in the through hole 324. The second coupling part 354 has one end electrically connected with the first coupling part 352 and another end electrically connected with a transducer 330 via a conductive wire 355. Wherein, the second coupling part includes a sleeve part 356 and a conductive post 358. The sleeve part 356 is fixed into the through hole 324, and the conductive post 358 extends within the sleeve part 356 in a slidable manner. The conductive post 358 is made of conductive material and has one end electrically connected with the conductive wire 355, and another end extending out of the sleeve part 356 to be electrically connected with the first coupling part 352. In this embodiment, when the toolholder 320 is engaged with the spindle shaft 314, the conductive post 358 is driven by an elastic force of an elastic member (not shown) to protrude from the rear end of the toolholder 320 to be electrically connected with the first coupling part 352. Wherein, the elastic member can be disposed between the sleeve part 356 and the conductive post 358 and has two ends respectively abut against the sleeve part 356 and the conductive post 358. However, it is not limited thereto.

It is worth mentioning that, in other embodiments, the high frequency vibration spindle system 300 could also utilize the electric power transmission device 40 of the first embodiment or the electric power transmission device 240 of the second embodiment instead of the electric power transmission device mentioned above. Wherein, when the electric power transmission devices of the first and second embodiments are utilized, which have the first coil and the second coil being overlapped in the radial direction, a total length of the high frequency vibration spindle system could be made shorter as comparing with the electric power transmission device of the third embodiment which has have the first coil and the second coil being overlapped in the axial direction. Besides, it is beneficial to utilize the electric power transmission device with the first coil and the second coil being overlapped in the radial direction to provide a higher spindle resonant frequency so as to rise an upper limit of the spindle resonant frequency at high rotation speed.

It shall be noted that each of the components exemplified in the above embodiments are interchangeable with one another. For instance, electric coupling module of the first embodiment could be applied to the high frequency vibration spindle systems of the second embodiment and the third embodiment, while the electric coupling modules of the second embodiment and the third embodiment could be utilized to replace the electric coupling module of the first embodiment and be applied to the high frequency vibration spindle system of the first embodiment. However, it is not limited thereto.

Furthermore, it is worth mentioning that the transducer of the present invention is disposed in the internal space of the toolholder. When the transducer is broken down or damaged, the transducer could be replaced by directly changing the old toolholder with a new toolholder without dissembling the spindle, thereby improving the convenience of maintenance or replacement so as to shorten the maintenance time and avoid a severe interruption of the processing progress in the factory.

It must be pointed out that the embodiments described above are only some embodiments of the present invention. All equivalent structures which employ the concepts disclosed in this specification and the appended claims should fall within the scope of the present invention.

What is claimed is:

1. A high frequency vibration spindle system, comprising:
a spindle, including a spindle housing and a spindle shaft, wherein the spindle has a front end and a rear end opposite to the front end, and the spindle shaft is disposed in the spindle housing in a rotatable manner;
a toolholder, having an internal space and engaged with a front end of the spindle with a detachable manner, being adapted to be engaged with a tool;
an electric power transmission device, including a first coil and a second coil, wherein the electric power transmission device is disposed at the front end or a rear end of the spindle; the first coil is disposed on the spindle housing, and the second coil is disposed on the spindle shaft to be rotated with the spindle shaft coaxially; the first coil and the second coil are spaced apart from each other with a gap; the second coil is adapted to receive an electric power from the first coil with a non-contact induction method; and
a transducer, adapted to be controlled to vibrate the tool and being disposed in the internal space of the toolholder and electrically connected with the second coil to receive the electric power;
wherein the first coil surrounds the spindle shaft and the second coil; the first coil includes a first ferrite core and a first coil assembly; the first ferrite core has a first core wall portion and a first core shoulder portion extending inwardly from the first core wall portion in the radial direction; the first coil assembly fits around an interior circumference of the first ferrite core; the first coil assembly abuts against the first core wall portion and the first core shoulder portion; the second coil surrounds the spindle shaft; the second coil includes a second ferrite core and a second coil assembly; the second ferrite core has a second core wall portion and a second core shoulder portion extending outwardly from the second core wall portion in the radial direction; the second coil assembly fits around an exterior circumference of the second ferrite core; the second coil assembly abuts against the second core wall portion and the second core shoulder portion; the first coil assembly and the second coil assembly face with each other in the radial direction; and
wherein as viewed from an outside of the spindle toward an axial direction thereof, the first core shoulder portion and the second core shoulder portion have an overlapped region with each other.

2. The high frequency vibration spindle system of claim 1, wherein the first coil includes a first sleeve; the first sleeve is disposed on the spindle housing; the first ferrite core fits around an interior circumference of the first sleeve;
the second coil includes a second sleeve, the second sleeve is disposed on the spindle shaft; the second ferrite core fits around an exterior circumference of the second sleeve.

3. The high frequency vibration spindle system of claim 2, wherein the first sleeve has a first sleeve wall portion and a first sleeve shoulder portion extending inwardly from the first sleeve wall portion in the radial direction; the first sleeve wall portion is engaged with the spindle housing; the first core wall portion and the first core shoulder portion respectively abut against the first sleeve wall portion and the first sleeve shoulder portion; the second sleeve has a second sleeve wall portion and a second sleeve shoulder portion extending outwardly from the second sleeve wall portion in the radial direction; the second sleeve wall portion is engaged with an exterior circumference of the spindle shaft; and the second core wall portion and the second core shoulder portion respectively abut against the second sleeve wall portion and the second sleeve shoulder portion.

4. The high frequency vibration spindle system of claim 1, further comprising a coupling module including a first coupling part, a second coupling part and a first conductive wire, wherein the first coupling part is disposed on the spindle shaft and electrically connected with the second coil to receive the electric power; the second coupling part is disposed on the toolholder and electrically connected with the transducer; the second coupling part is engaged with the first coupling part in a detachable manner so as to receive and transmit the electric power to the transducer; the spindle shaft has a channel extending in the axial direction, and the first coupling part and the first conductive wire of the coupling module are disposed in the channel; one end of the first conductive wire is electrically connected with the second coil and another end of the first conductive wire is electrically connected with the first coupling part.

5. The high frequency vibration spindle system of claim 4, further comprising a coupling module including a first coupling part, a second coupling part and a second conductive wire, wherein the first coupling part is disposed on the spindle shaft and electrically connected with the second coil to receive the electric power; the second coupling part is disposed on the toolholder and electrically connected with the transducer; the second coupling part is engaged with the first coupling part in a detachable manner so as to receive and transmit the electric power to the transducer; the toolholder has a through hole extending in the axial direction and communicating with the internal space of the toolholder; the second coupling part of the coupling module is disposed above the through hole; one end of the second conductive wire is electrically connected with the second coupling part and another end of the second conductive wire is electrically connected with the transducer.

6. The high frequency vibration spindle system of claim 1, further comprising a coupling module including a first coupling part and a second coupling part, wherein the first coupling part is disposed on the spindle shaft and electrically connected with the second coil to receive the electric power; the second coupling part is disposed on the toolholder and electrically connected with the transducer; the second coupling part is engaged with the first coupling part in a detachable manner so as to receive and transmit the electric power to the transducer; the front end of the spindle is further provided with at least one alignment pin on which the first coupling part is disposed; an exterior circumference of the toolholder is further provided with at least one alignment slot, being engaged with the alignment pin in a detachable manner; the second coupling part is disposed on an inner surface of the alignment slot.

7. The high frequency vibration spindle system of claim 1, further comprising a coupling module including a first coupling part and a second coupling part; the first coupling part is disposed on the spindle shaft and electrically connected with the second coil to receive the electric power; the second coupling part is disposed on the toolholder and electrically connected with the transducer; the second coupling part is engaged with the first coupling part in a detachable manner so as to receive and transmit the electric power to the transducer; the spindle shaft has a conical hole formed at a front end thereof in the axial direction, in which is disposed the first coupling part; the toolholder has a conical section with an exterior surface disposed with the second coupling part, which could be engaged with the conical hole in a detachable manner.

8. The high frequency vibration spindle system of claim 1, further comprising a coupling module including a first coupling part and a second coupling part, wherein the first coupling part is disposed on the spindle shaft and electrically connected with the second coil to receive the electric power; the second coupling part is disposed on the toolholder and electrically connected with the transducer; the second coupling part is engaged with the first coupling part in a detachable manner to receive and transmit the electric power to the transducer; the spindle shaft has a first flange surface which faces forward, being provided with the first coupling part, while the toolholder has a second flange surface which faces rearward, being provided with the second coupling part; the first flange surface and the second flange surface face with each other.

9. A high frequency vibration spindle system, comprising:
a spindle, including a spindle housing and a spindle shaft, wherein the spindle has a front end and a rear end opposite to the front end, and the spindle shaft is disposed in the spindle housing in a rotatable manner;
a toolholder, having an internal space and engaged with the front end of the spindle with a detachable manner, being adapted to be engaged with a tool;
an electric power transmission device, including a first coil and a second coil, wherein the electric power transmission device is disposed at the front end or the rear end of the spindle; the first coil is disposed on the spindle housing, and the second coil is disposed on the spindle shaft to be rotated with the spindle shaft coaxially; the first coil and the second coil are spaced apart from each other with a gap; the second coil is adapted to receive an electric power from the first coil with a non-contact induction method; and
a transducer, adapted to be controlled to vibrate the tool and being disposed in the internal space of the toolholder and electrically connected with the second coil to receive the electric power;
wherein the first coil surrounds the spindle shaft and the second coil; the first coil includes a first ferrite core and a first coil assembly; the first coil assembly fits around an interior circumference of the first ferrite core; the second coil surrounds the spindle shaft; the second coil includes a second ferrite core and a second coil assembly; the second coil assembly fits around an exterior circumference of the second ferrite core; the first coil assembly and the second coil assembly face with each other in the radial direction;
wherein the first ferrite core includes two first core bodies, each of the two first core bodies has a first core wall portion and a first core shoulder portion extending inwardly from the first core wall portion in the radial direction; the first core wall portions of the two first core bodies face with each other; and the first coil assembly abuts against the two first core wall portions and is disposed between the two first core shoulder portions.

10. The high frequency vibration spindle system of claim 9, wherein the first coil includes a first sleeve; the first sleeve is disposed on the spindle housing; the first ferrite core fits around an interior circumference of the first sleeve; the second coil includes a second sleeve; the second sleeve is disposed on the spindle shaft; and the second ferrite core fits around an exterior circumference of the second sleeve and abuts against the first sleeve.

11. The high frequency vibration spindle system of claim 9, wherein as viewed from an outside of the spindle toward an axial direction thereof, the two first core shoulder portions of the two first core bodies have an overlapped region with each other, and the second ferrite core and the second coil assembly are located within the overlapped region of the two core shoulder portions.

12. The high frequency vibration spindle system of claim 9, further comprising a coupling module including a first coupling part, a second coupling part and a first conductive wire, wherein the first coupling part is disposed on the spindle shaft and electrically connected with the second coil to receive the electric power; the second coupling part is disposed on the toolholder and electrically connected with the transducer; the second coupling part is engaged with the first coupling part in a detachable manner so as to receive and transmit the electric power to the transducer; the spindle shaft has a channel extending in the axial direction, and the first coupling part and the first conductive wire of the coupling module are disposed in the channel; one end of the first conductive wire is electrically connected with the second coil and another end of the first conductive wire is electrically connected with the first coupling part.

13. The high frequency vibration spindle system of claim 12, further comprising a coupling module including a first coupling part, a second coupling part and a second conductive wire, wherein the first coupling part is disposed on the spindle shaft and electrically connected with the second coil to receive the electric power; the second coupling part is disposed on the toolholder and electrically connected with the transducer; the second coupling part is engaged with the first coupling part in a detachable manner so as to receive and transmit the electric power to the transducer; the toolholder has a through hole extending in the axial direction and communicating with the internal space of the toolholder; the second coupling part of the coupling module is disposed above the through hole; one end of the second conductive wire is electrically connected with the second coupling part and another end of the second conductive wire is electrically connected with the transducer.

14. The high frequency vibration spindle system of claim 9, further comprising a coupling module including a first coupling part and a second coupling part, wherein the first coupling part is disposed on the spindle shaft and electrically connected with the second coil to receive the electric power; the second coupling part is disposed on the toolholder and electrically connected with the transducer; the second coupling part is engaged with the first coupling part in a detachable manner so as to receive and transmit the electric power to the transducer; the front end of the spindle is further provided with at least one alignment pin on which the first coupling part is disposed; an exterior circumference of the toolholder is further provided with at least one alignment slot, being engaged with the alignment pin in a detachable manner; the second coupling part is disposed on an inner surface of the alignment slot.

15. The high frequency vibration spindle system of claim 9, further comprising a coupling module including a first coupling part and a second coupling part; the first coupling part is disposed on the spindle shaft and electrically connected with the second coil to receive the electric power; the second coupling part is disposed on the toolholder and electrically connected with the transducer; the second coupling part is engaged with the first coupling part in a detachable manner so as to receive and transmit the electric power to the transducer; the spindle shaft has a conical hole formed at a front end thereof in the axial direction, in which is disposed the first coupling part; the toolholder has a conical section with an exterior surface disposed with the second coupling part, which could be engaged with the conical hole in a detachable manner.

16. The high frequency vibration spindle system of claim 9, further comprising a coupling module including a first coupling part and a second coupling part, wherein the first coupling part is disposed on the spindle shaft and electrically connected with the second coil to receive the electric power; the second coupling part is disposed on the toolholder and electrically connected with the transducer; the second coupling part is engaged with the first coupling part in a detachable manner to receive and transmit the electric power to the transducer; the spindle shaft has a first flange surface which faces forward, being provided with the first coupling part, while the toolholder has a second flange surface which faces rearward, being provided with the second coupling part; the first flange surface and the second flange surface face with each other.

* * * * *